(12) United States Patent
Camenzind et al.

(10) Patent No.: US 7,306,366 B1
(45) Date of Patent: Dec. 11, 2007

(54) MULTIFUNCTION TOOL

(75) Inventors: Lorenz Camenzind, Lucerne (CH); Peter Joder, Kriens (CH)

(73) Assignee: Flytec AG (CH)

( * ) Notice: Subject to any disclaimer, the term of this patent is extended or adjusted under 35 U.S.C. 154(b) by 0 days.

(21) Appl. No.: 09/674,600

(22) PCT Filed: May 4, 1999

(86) PCT No.: PCT/CH99/00184

§ 371 (c)(1), (2), (4) Date: Dec. 13, 2000

(87) PCT Pub. No.: WO99/56918

PCT Pub. Date: Nov. 11, 1999

(30) Foreign Application Priority Data

May 6, 1998 (CH) ................................. 1025/98

(51) Int. Cl.
*B26B 11/00* (2006.01)
*B25B 33/00* (2006.01)

(52) U.S. Cl. ............... 374/141; 374/170; 374/208; 374/142; 374/143; 30/155; 362/119

(58) Field of Classification Search ............... 374/142, 374/143, 158, 141, 208, 170; 33/760, 333–336; 73/1.08, 1.13, 174; 362/119–120
See application file for complete search history.

(56) References Cited

U.S. PATENT DOCUMENTS

| | | | | |
|---|---|---|---|---|
| 2,914,850 A | * | 12/1959 | Kuhnl | 30/156 |
| 4,040,181 A | * | 8/1977 | Johnson | 30/161 |
| 4,261,103 A | * | 4/1981 | Heck | 30/159 |
| 4,340,796 A | * | 7/1982 | Yamaguchi et al. | 219/10.55 B |
| 4,414,985 A | * | 11/1983 | Myer | 128/782 |
| 4,570,341 A | * | 2/1986 | Konneker | 30/161 |
| 4,660,666 A | * | 4/1987 | Reder et al. | 177/148 |
| 4,693,125 A | | 9/1987 | Krutz | |
| 4,776,094 A | * | 10/1988 | Glesser | 30/160 |
| 4,854,045 A | | 8/1989 | Schaub | |
| 4,908,947 A | * | 3/1990 | Schaub | 30/155 |
| 5,059,970 A | * | 10/1991 | Raubenheimer et al. | 342/451 |
| 5,313,376 A | * | 5/1994 | McIntosh | 362/119 |
| 5,379,524 A | | 1/1995 | Dawson | |
| 5,392,622 A | * | 2/1995 | O'Donnell | 70/456 R |
| 5,433,014 A | | 7/1995 | Falk | |
| 5,467,656 A | * | 11/1995 | Teare et al. | 73/862.541 |
| 5,485,410 A | | 1/1996 | Mastromattei | |
| 5,495,942 A | * | 3/1996 | Izhak | 206/372 |
| 5,545,855 A | | 8/1996 | Stanfield | |
| 5,617,597 A | * | 4/1997 | Reitz | 7/113 |
| 5,621,936 A | * | 4/1997 | Penaligon et al. | 7/151 |
| 5,634,719 A | * | 6/1997 | La Neve | 374/141 |

(Continued)

FOREIGN PATENT DOCUMENTS

DE 3607363 9/1987

(Continued)

*Primary Examiner*—Gail Verbitsky
(74) *Attorney, Agent, or Firm*—Ostrolenk, Faber, Gerb & Soffen, LLP

(57) ABSTRACT

The invention relates to a multifunctional tool such as, for example, a multifunctional pocket knife which is characterized by having at least one measuring and display device (12, 14) for measuring and displaying a physical value.

12 Claims, 4 Drawing Sheets

U.S. PATENT DOCUMENTS

| | | | | |
|---|---|---|---|---|
| 5,652,587 | A * | 7/1997 | Liu | 341/176 |
| 5,724,317 | A * | 3/1998 | Kubota et al. | 368/11 |
| 5,798,964 | A * | 8/1998 | Shimizu et al. | 365/145 |
| 5,800,165 | A * | 9/1998 | Kirsch et al. | 433/29 |
| 5,809,600 | A * | 9/1998 | Cachot | 7/128 |
| D405,603 | S * | 2/1999 | Tenny | D3/210 |
| 5,875,413 | A * | 2/1999 | Vinci | 702/91 |
| 5,883,306 | A * | 3/1999 | Hwang | 73/146.8 |
| 5,899,569 | A * | 5/1999 | Favale | 374/141 |
| 5,983,783 | A * | 11/1999 | Archard et al. | 99/342 |
| 6,000,845 | A * | 12/1999 | Tymkewicz et al. | 374/155 |
| 6,043,438 | A * | 3/2000 | Helberg | 177/148 |
| D433,303 | S * | 11/2000 | Park | D8/99 |
| 6,237,582 | B1 * | 5/2001 | McPherson | 124/25.6 |
| 6,243,660 | B1 * | 6/2001 | Hsu et al. | 702/160 |
| 6,273,582 | B1 * | 8/2001 | Taggart et al. | 362/119 |
| 6,298,336 | B1 * | 10/2001 | Davis et al. | 705/41 |
| 6,367,011 | B1 * | 4/2002 | Lee et al. | 713/172 |
| 6,424,884 | B1 * | 7/2002 | Brooke et al. | 700/232 |
| 6,592,362 | B2 * | 7/2003 | Fisher | 431/152 |
| 6,619,225 | B1 * | 9/2003 | Presniakov et al. | 116/137 R |
| 6,678,630 | B1 * | 1/2004 | Joder et al. | 702/139 |
| 6,749,318 | B1 * | 6/2004 | Palacios | 362/119 |
| D497,528 | S * | 10/2004 | Harris | D8/34 |
| 6,808,111 | B2 * | 10/2004 | Kashef et al. | 235/380 |
| 6,845,535 | B2 * | 1/2005 | Phelps | 7/118 |
| 2001/0040911 | A1 * | 11/2001 | Rubenstein | 174/141 |
| 2002/0075673 | A1 * | 6/2002 | Phelps | 362/119 |
| 2002/0189411 | A1 * | 12/2002 | Berg et al. | 81/427.5 |
| 2003/0016531 | A1 * | 1/2003 | Galli | 362/119 |
| 2003/0127253 | A1 * | 7/2003 | Heyn | 177/148 |
| 2003/0223224 | A1 * | 12/2003 | Painsith et al. | 362/119 |
| 2004/0016058 | A1 * | 1/2004 | Gardiner et al. | 7/119 |
| 2004/0141313 | A1 * | 7/2004 | Elsener | 362/119 |
| 2004/0174700 | A1 * | 9/2004 | Zirk et al. | 362/119 |
| 2004/0187313 | A1 * | 9/2004 | Zirk et al. | 30/123 |
| 2005/0081302 | A1 * | 4/2005 | Elsener | 7/118 |
| 2005/0241071 | A1 * | 11/2005 | Camenzind et al. | 7/118 |

FOREIGN PATENT DOCUMENTS

| | | |
|---|---|---|
| EP | 0816862 | 1/1998 |
| GB | 2146623 A * | 9/1983 |
| JP | 2001010570 A * | 1/2001 |

* cited by examiner

MULTIFUNCTION TOOL

The present invention relates to a multifunctional tool such as a pocket knife, pliers, a clamp and similar, specifically suitable for leisure time sport, expeditions, for handymen, for the military service and similar.

The time, in which the pocket knife or other hand tools have merely been used as pure tools has past since a long time. The longer the more further functions are added to the pocket knife, in these days, for instance, pocket knives are offered which can be used as multifunctional tools and domestic appliances, respectively. Thus, pocket knives include besides the knife-blades proper scissors, nail tiles, tooth picks, saws, etc.

Besides this, pocket knives and other tools include as of late integrally also flash lights and also pocket knives are even offered which contain integrally a watch in one of the two covers.

By the DE 3607363 a screwing tool such as specifically a torque meter screw driver is known, at which various tool inserts can be mounted in one handle. It is, thereby, always a matter of screwing tools, i.e. tools with one and the same function. This tool does indeed include additionally a measuring sensor for a determining of the torque generated in the tool, however, for an evaluation and display of the measured value an electrical signal must be transmitted to an externally arranged converter and display device, wherewith the total arrangement can hardly be used as an easily manageable hand tool.

In U.S. Pat. No. 4,854,045 a pocket knife is proposed which can be provided modularly differently by means of various units. Modules can be here connected to each other in plugged in manner for instance by means of a dove tail like recess. By means of electrical connecting contacts it is possible to arrange in place of a pure knife containing modules also electronic devices such as for instance a miniature radio. The proposed pocket knife can in no way be understood as a multifunctional tool or household appliance, respectively, in the sense of the present invention.

The object of the present invention is now to broaden the functionality of a pocket knife or generally of a hand tool to a so called multifunctional tool, this specifically because hand tools are carried along by a great many of persons in a multitude of situations of their life.

In accordance with the invention it is not proposed to arrange integrally in a multifunctional tool, such as a hand tool, such as for instance a multifunctional pocket knife also measuring and/or entering and display devices which serve for the measuring and/or entering and displaying of a physical value.

It is proposed to arrange in or at the tool, such as a pocket knife at least one of the following exemplary measuring and display devices:

Altitude indicator, compass, barometer, thermometer, hygrometer, anemometer, speed indicator, a balance and/or a satellite navigation device.

In order that such a measuring and display device is able to function completely, the arranging of following parts is necessary:

At least one measuring sensor and/or entering member for the measuring and/or entering or determining of a physical value.

at least one converter for a converting the measured or entered physical value into a corresponding electrical signal.

a microprocessor which is suitable for a deducing from the converted electrical signal a standardized physical standard value, and a display of the measured or entered physical value in the corresponding unit, as well:

The display encompasses preferably a so-called LCD-display (Liquid Crystal Display).

Because of the dimensions of a tool such as a pocket knife it does not make sense to foresee a individual display for every one of all of the above suggested measuring and display devices for which reason the displaying occurs in a combined display common to all. However, in order to now display a certain measurement value in the display the arranging of a menu device is additionally needed by means of which the desired display can be selected from the various physical measure values.

Besides this it is obviously possible to foresee the already known function units integrally in a tool, such as a pocket knife, such as for instance a flash light or a watch. In case that a watch is arranged it even is possible or preferred to arrange the time display in the same display which is also suitable for a displaying or announcing, respectively of the respective physical value. Accordingly, the display of the time can also be accessed and displayed, respectively by means of the mentioned menu-device.

The electrical supply of the measuring and display device can be accomplished either by a battery or, however, by a solar cell. Specifically when using a battery it is advantageous if a switch on or switch off member is provided, by means of which the measuring and display device can be by demand switched on and again be switched off, respectively. Further, it is also possible to foresee a automatic switching off which is activated after a certain time after a switching on or a last changing, respectively, by means of the menu device.

In case that a scale device is arranged in the tool suggested in accordance with the invention, such may be a spring scale which can be pulled out or be swung out, or it may be a weighing cell responding to pressure, which is located in the casting or can be swung out.

In the following, the invention will now be exemplary additionally explained by reference to the appended drawings.

There is illustrated in:

FIG. 1 in a perspective view a pocket knife equipped in accordance with the invention, FIG. 2 a further variant of the embodiment of a pocket knife in accordance with the invention, FIG. 3 a specific arrangement of a temperature sensor at a swung out awl of a pocket knife in accordance with the invention, FIG. 4, illustrated schematically, various current and data connection and transmission, respectively, members between two pocket knife cover plates.

FIG. 5 schematically, swung out, a weighing device,

FIG. 6 a further embodiment of a weighing device,

FIG. 7 again a further arrangement of a weighing cell in a pocket knife

FIGS. 8*a* and 8*b* each a further variant of a embodiment of a pocket knife in accordance with the invention, including a cover which can be mounted in a again removable manner, containing at least in part the measuring and display device, and FIG. 9 in a perspective view, a further multifunctional tool equipped in accordance with the present invention.

FIG. 1 illustrates a multifunctional tool in accordance with invention in form of a pocket knife 1, including various mechanical function devices, such as for instance a knife blade 2 which can be swung out, scissors 3 which can be swung out, a rasp 4 which can be swung out, respectively.

The pocket knife is covered at both sides by cover plates 6 and 7, which as a rule are made of a plastic material, which however can obviously also be made of wood or metal. The pocket knife is held together by pins or locking bolts 9 and 10 located at its respective ends.

In the upper cover plate 6, a temperature sensor is for instance integrally arranged for a measuring of the ambient temperature. The measured temperature signal is converted by a not illustrated converter and microprocessor arranged integrally in the cover plate 6 into the corresponding physical temperature value, and the value determined in this way is displayed in the display 14 in degrees Celsius. The display 14 is preferably a so called LCD-display.

Preferably, several measuring and display devices are arranged for instance in the cover plate 6, but obviously parts of the measuring and display devices may also be arranged in the cover plate 7. Because, however, due to reasons of space, as a rule only one display 14 is foreseen, it conclusively is necessary that it is possible to switch between various displays, which may for instance be accomplished by means of a menu device. In order to operate the menu device a pressure sensor is arranged at the illustrated example, which for instance is again arranged in the casing under the illustrated Swiss cross. By a depressing of the "Swiss cross" 16 it is thus possible to switch from the illustrated temperature measuring to the display of the measured air pressure. Additionally it is also possible that for instance upon a prolonged depressing, the display switches automatically off, and then for instance the time is displayed. Only after a further short depressing a physical value is again displayed in the display 14.

FIG. 2 illustrates a further embodiment of a multifunctional tool, such as a pocket knife, in a kind which finds use predominantly in the Angle-Saxon area. Various mechanical tools are arranged in the pocket knife 31 in a U-shaped casing 33a, which can be swung out around a locking pin or a pivot pin 35, respectively, such as the swung out knife 4 illustrated in FIG. 2. In order to arrange this swung out knife blade 4 fastened in the swung out position a corresponding cover 33 is preferably plugged onto the U-shaped casing 33a, which in order to pivot the knife back can again be removed. This cover can either be completely removable or may also be pivotally mounted to the U-shaped casing 33a to pivot about a further axis. Analogue to FIG. 1 a display 14 is also illustrated in FIG. 2 laterally in the U-shaped casing 33a, in which again the measured physical values can be displayed. Obviously, this display can also be arranged in the area of the U-leg surface of the casing 33a or even in the cover 33. At the illustration according to FIG. 2 the task is primarily to show that the present invention is not restricted to conventional pocket knives, such as for instance used in Western Europe. Such as already mentioned above, the present invention is basically suitable for any kind of multifunctional tools, to which also the most various designs of pocket knives belong.

FIG. 3 illustrates a specific embodiment variant of the arranging of a temperature sensor 39 at the tip of a awl 37, whereby FIG. 3 illustrates the awl in a swung out state. Such a temperature sensor can be used for example to measure during grilling the temperature inside of meat in order to see how far the roasting and cooling process has advanced.

Specifically in the case where a plurality of different measuring sensors and possibly also in both cover plates displays are foreseen, it is necessary to arrange in both cover plates 6 and 7 corresponding measuring sensors, circuits, microchips and similar. Thus it is, however, also important that a current and also a data exchange, as well, can take place between the two cover plates 6 and 7 which may proceed for instance via the two locking pins 9. It is, however, also possible to arrange between the two cover plates 6 and 7 for instance at the end area an additional cover or connecting plate 43, for the transmission of data and the supply of current. From time to time pocket knives are provided with supporting brackets 41 such to for instance mount a pocket knife to a supporting chain. These supporting brackets can again serve for a transmitting of data and the supply of current.

Figure 7:
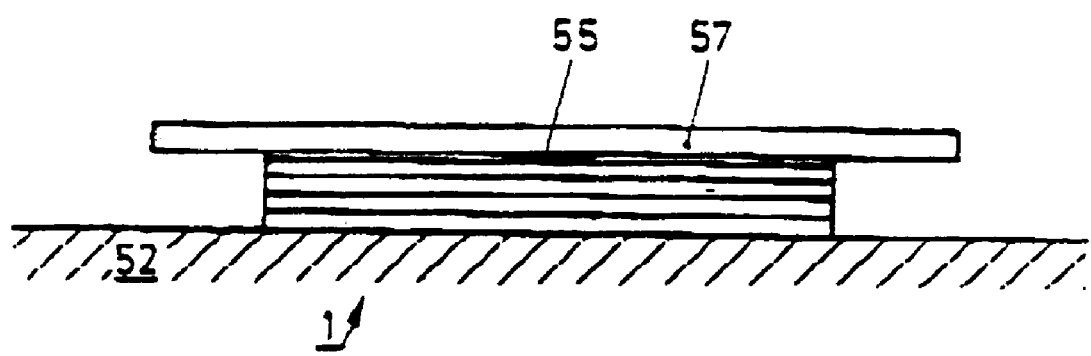

FIG. 7 illustrates a pocket knife 1 in which a weighing cell 55 responding to pressure is arranged in one of the two covers. Thus, the pocket knife 1 may be placed onto a support 52 and an article 57 to be weighed may be placed onto the pocket knife. Because in the illustrated illustration in FIG. 7 no display is visible it makes sense to store the measured value such that the measured weight becomes visible upon a removing of the article 57.

Figure 8A:
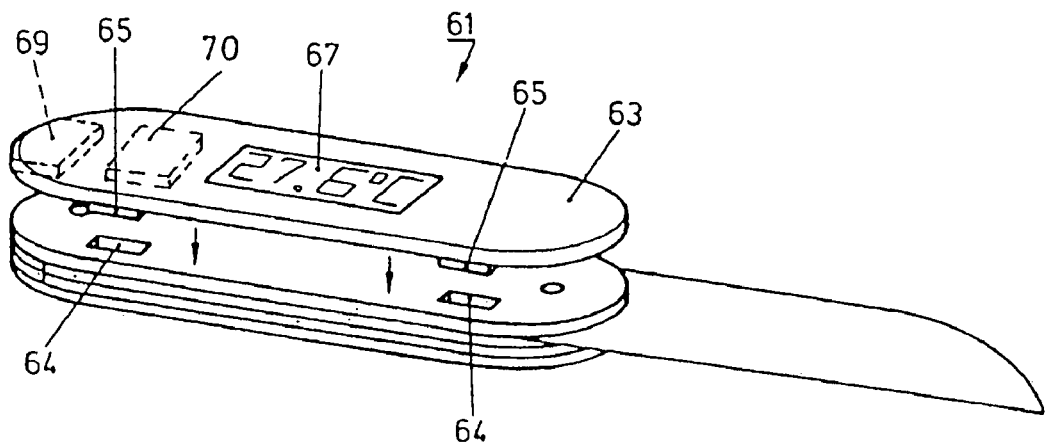
Figure 8B:
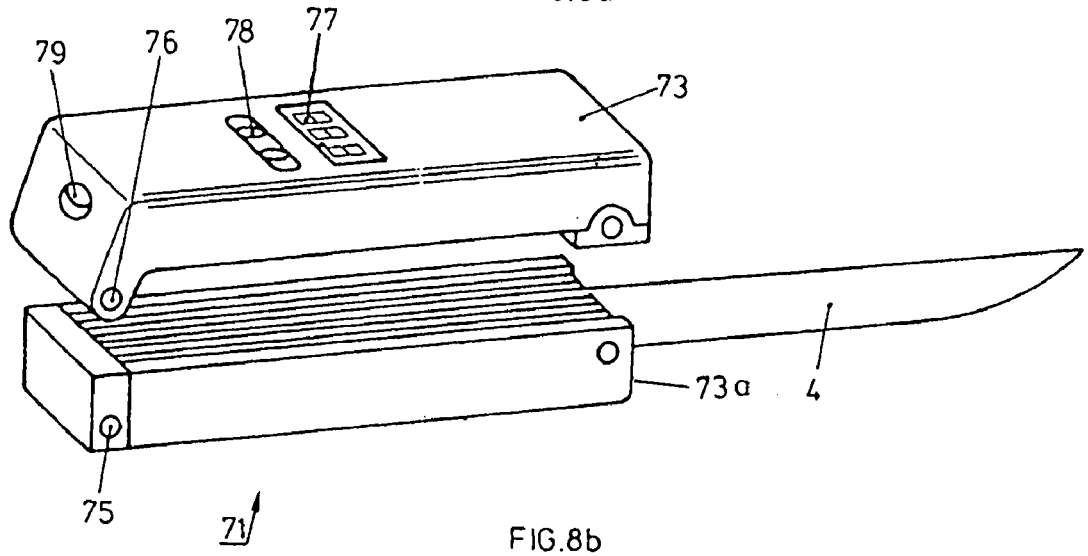

In each of the FIGS. 8a and 8b a further pocket knife according to the invention similar to the pocket knife illustrated in FIG. 2 is illustrated, again having a cover mounted removable to the pocket knife.

FIG. 8a illustrates in perspective a pocket knife 61 onto which cover plate 63 can be plugged by means of recesses 64 in the pocket knife and corresponding plugging pins 65 in the cover. The plug connection can be such that upon a plugging the pins 65 engage the recesses 64 such that a firm connection is produced. Quite obviously snap on connections can be chosen in place of plug in connections, a screw connection or even an adhering connection, by means of a so called velcro fastener.

Again, a display 67 can be recognized in the cover plate 63 and—now additionally—an interface 69 in order to for instance transmit data stored in the measuring and display device to a different apparatus, such as for instance a computer. In this way it is possible to store over a prolonged time data for instance in the cover plate 63 in a storage medium foreseen in same and to transmit these data at a later date by plugging a cable into the interface 69. By the placing of the measuring and display device in a cover plate 63 this storing of data and later transmitting to a evaluation device such as for instance a PC is simplified in that this cover plate 63 can be removed from the tool such as the pocket knife 61. In this way it is for instance possible to give such cover plates 63 to various persons who own a pocket knife of the kind illustrated in FIG. 8a and to collect these cover plates after a certain time. It is, thereby, obviously possible to code these cover plates 63 or to have them coded automatically when plugging onto the knife 61. After the collecting, the diverse stored data can be transmitted to a PC and evaluated in same. As an exemplary application attention shall be drawn to the measuring of radiation.

Such separate cover plates are also suitable to store data for an entrance control, i.e. for so-called "Access-Control." Such a cover plate can accordingly be provided for instance with a ski pass or any other signal in order to allow access to any institution. Obviously this "Access-Control" member may also be arranged integrally in the tool itself.

A further example consists in the arranging of a so called ELT (=Emergence Localization Transmitter) whereby by means of an emitted signal a person for instance at an emergency can be localized. The radiation-measuring device, access control circuit and ELT are illustrated schematically at 70 in FIG. 8*a*.

Figure 1:
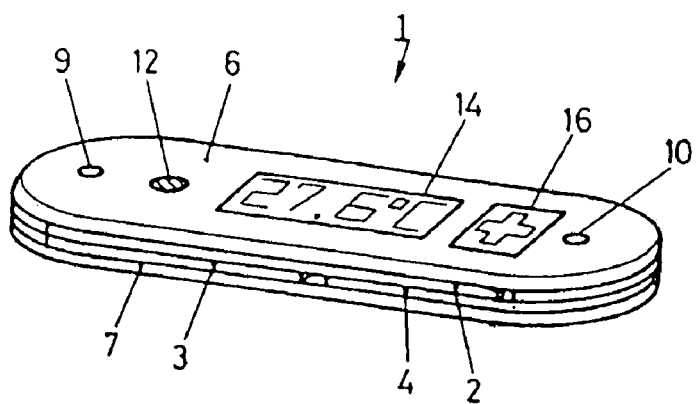
Figure 2:
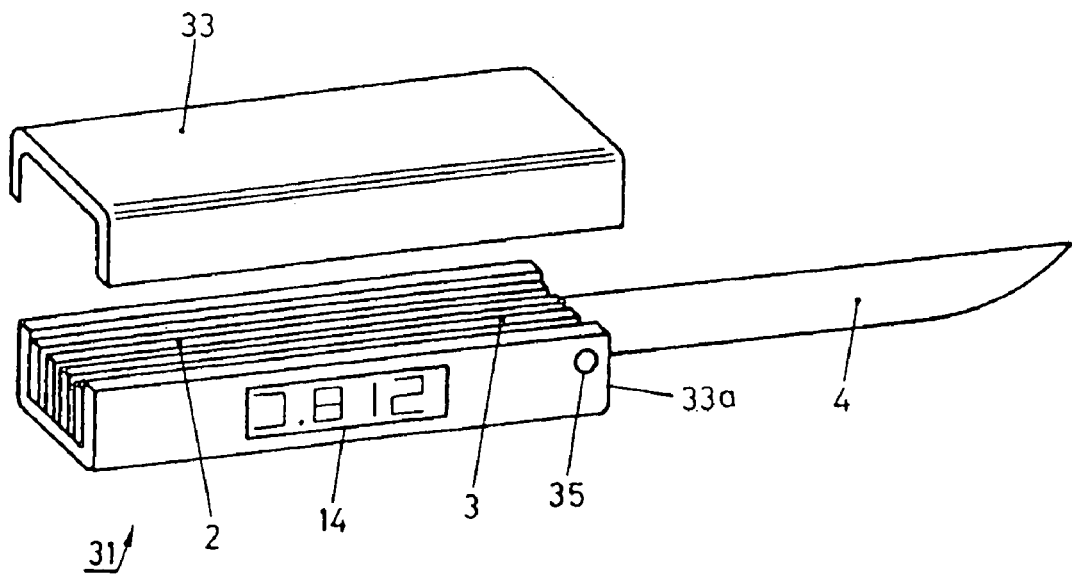
Figure 3:
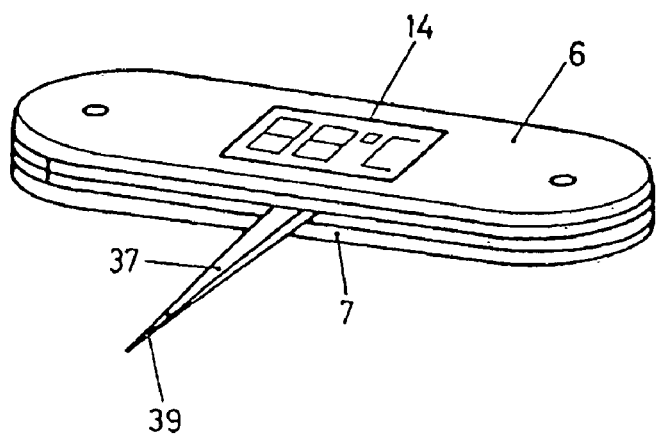
Figure 4:
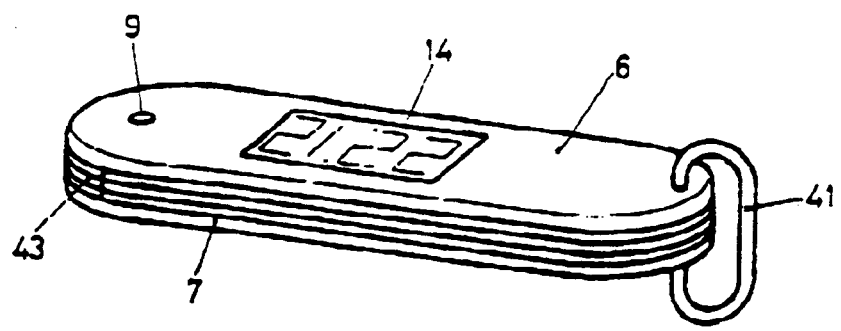
Figure 5:
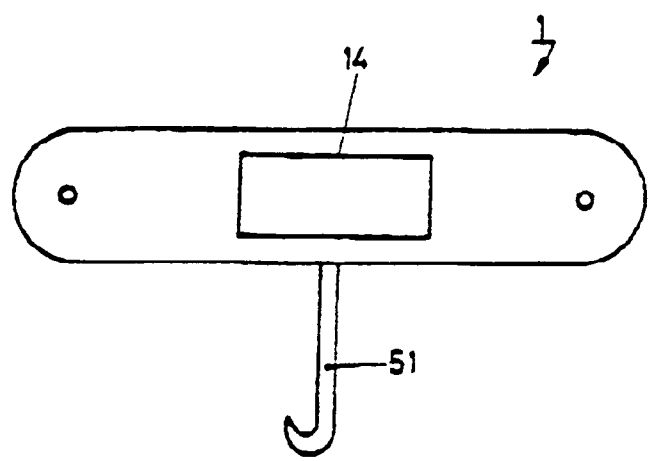
FIG. 5 illustrates simplified a swung out weighing element 51 onto which a weight can be hung.
Figure 6:
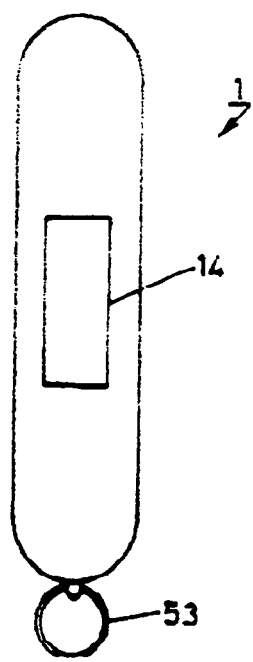
FIG. 6 illustrates a mounting ring 53 at an end area, which at the one hand can serve for a mounting of the pocket knife 1 to a necklace or however again for the weighing of articles.

Similarly, a further similar embodiment variant of the pocket knife as shown in FIG. 2 is illustrated in FIG. 8*b*, similar in that here a cover 73 can be plugged onto a pocket knife 71 with a casing 73*a* by means of pins 76 and corresponding recesses 75. It is, thereby, for instance possible that pins 76 can be depressed such that the cover can easily be removed from the pocket knife 71. Again, a display 77 can be recognized and now, different from the embodiment in FIG. 8*a*, an infrared emitter 79 is provided in order to for instance transmit data by means of infrared or other suitable wireless transmitting techniques to a data storing or evaluating medium, such as for instance a PC. Finally recognizable is a menu selecting switch device 78 in order to switch between different measuring and display menus. It is not necessary to enter further into the functioning of the pocket knife illustrated in FIG. 8*b* because it is analogous to the functioning of the tool illustrated in FIG. 8*a*. It shall be mentioned merely that the connection interface for performing a data logger function foreseen in FIG. 8*a* allows a wireless transmitting of data such as for instance inductively, without any visible contacts, capacitively or purely telemetrically i.e. via a wireless frequency. Obviously it is also possible to arrange at the cover plate, such as by the way also integrally at the pocket knife itself, an antenna which can be plugged in or screwed on in order to transmit data.

Figure 9:
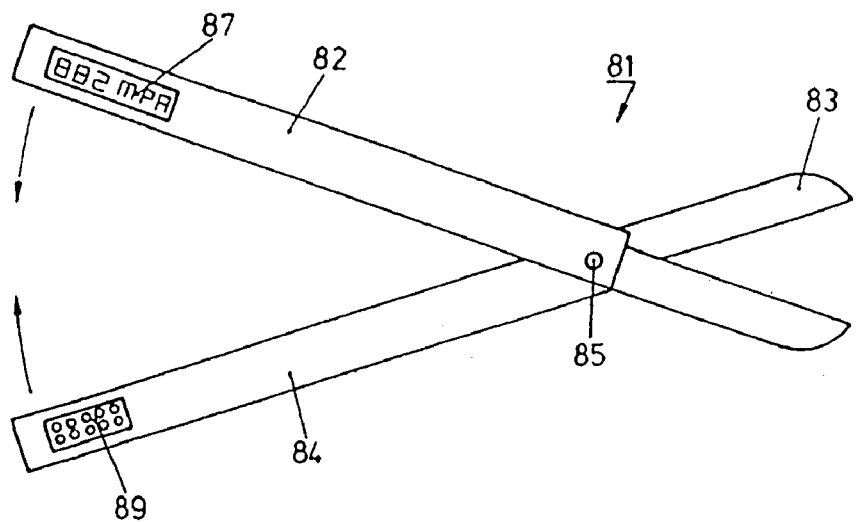

In FIG. 9, finally, a further multifunctional tool 81 is illustrated, containing for instance two legs of pliers 83 which can be pivoted outwards, which each can be swung into a tool leg 82 and 84, respectively pivotally around the axis 85. The two tool legs 82 and 84 themselves can obviously also be pivoted around the axis 85 towards each other in order to form a compact, easily storable or transportable tool. Again illustrated in the two legs 82 and 84 are a display 87 and a connection socket 89, which serves as the interface for the transmission data. All matters and measuring and display devices described and illustrated in the preceding FIGS. 1 to 8 can obviously be arranged and integrated, respectively in a tool which corresponds to the one illustrated in FIG. 9. FIG. 9 serves merely to illustrate that the present invention is by no means restricted to pocket knives, but that the arranging of the described inventive display and measuring devices and of the evaluation elements belonging thereto may be arranged in any kind of tool, such as specifically a manual tool.

The multifunctional tool illustrated in FIGS. 1 to 9 in form of pocket knives and pliers are obviously merely examples which may be changed, modified or supplemented with further elements in any arbitrary way. In this way it is obviously possible to arrange besides the mentioned measuring and display devices if needed further devices such as for instance a anemometer which can be swung out.

Furthermore, all tools and also measuring cells in the examples of the FIGS. 1 to 9 are described or illustrated, respectively, as arranged to possibly be swung out; obviously these tools and measuring devices may also be arranged to be able to be moved or slid out in the tool.

The tool or manual tool, respectively, proposed in accordance with the invention, such as specifically pocket knife, is specifically suitable for activities in sports, such as for instance sailing, for mountain sports, kinds of flying sports, diving, etc. But it is also specifically suitable for expeditions, in the military field and also for handymen and specific professional activities.

The invention claimed is:

1. Multifunctional tool comprising
    at least one pocket knife in combination with
    at least one measuring and display device for measuring and displaying a plurality of physical values, and having a display for displaying said plurality of physical values, and a menu circuit for selecting said physical values to be displayed;
    said at least one measuring and display device, said menu circuit, and said display being arranged integrally with the pocket knife;
    further comprising an access control member in the pocket knife, said access control member comprising an Access-Control-Circuit.

2. Tool according to claim 1, wherein said measuring and display device switches off automatically after a predetermined period of time.

3. Tool according to claim 1, wherein said measuring and display device comprises at least one measuring sensor for measuring at least one of said plurality of physical values,
    a converter for converting the measured value into an electrical signal,
    a microprocessor for converting the electrical signal into a standardized physical unit, and
    a display of the measured physical value in terms of said unit.

4. Tool according to claim 3, further comprising at least one storage device for the storing of the measured value.

5. Tool according to claim 1, characterized in that the measuring and display device can be switched on or off.

6. Tool according to claim 1, further comprising a weighing device arranged for being pulled out or swung out of the pocket knife.

7. Tool according to claim 1, characterized in that the tool has an interface providing communication with an external device, which permits input of data into the measuring and display device and transmission of data from the measuring and display device.

8. Tool according to claim 7, characterized in that the interface is capable of transmission of data by at least one of cable transmission, wireless data transfer, and optical data transfer.

9. Tool according to claim 1, further comprising a pressure-sensitive switch for operating the menu circuit.

10. Multifunctional tool comprising
    at least one pocket knife in combination with
    at least two cover plates enclosing the at least one pocket knife and
    at least one measuring and displayed device for measuring and displaying a plurality of physical values, and having a display for displaying said plurality of physical values, and a menu circuit for selecting said physical values to be displayed;
    said at least one measuring and display device, said menu circuit, and said display, being arranged in at least one of said at least two cover plates, said at least two cover plates being attached integrally with the pocket knife;
    further comprising a sending member for sending a localizing signal in order to localize a person carrying the pocket knife, said sending member comprising an ELT (Emergency Localization Transmitter).

11. Multifunctional tool comprising
    at least one pocket knife in combination with
    at least two cover plates enclosing the at least one pocket knife and
    at least one measuring and display device for measuring and displaying a plurality of physical values, and having a display for displaying said plurality of physical values, and a menu circuit for selecting said physical values to be displayed;

said at least one measuring and display device, said menu circuit, and said display, being arranged in at least one of said at least two cover plates, said at least two cover plates being attached integrally with the pocket knife;

further comprising an access control member in the pocket knife, said access control member comprising an Access-Control-Circuit.

12. Multifunctional tool comprising at least one pocket knife in combination with at least one measuring and display device for measuring and displaying a plurality of physical values, and having a display for displaying said plurality of physical values;

said at least one measuring and display device and said display being arranged integrally with the pocket knife; and further comprising an access control member in the pocket knife, said access control member comprising an Access-Control-Circuit.

* * * * *